(12) United States Patent
Parker et al.

(10) Patent No.: US 8,099,813 B2
(45) Date of Patent: Jan. 24, 2012

(54) RAMP ASSEMBLY FOR MOBILE SHELVING

(75) Inventors: Brian Maurice Parker, Panorama (AU); George Giles Campbell, Brighton (AU)

(73) Assignee: Glidestore Freetrack Pty. Ltd., Norwood (AU)

( * ) Notice: Subject to any disclaimer, the term of this patent is extended or adjusted under 35 U.S.C. 154(b) by 0 days.

(21) Appl. No.: 12/673,842

(22) PCT Filed: Aug. 18, 2008

(86) PCT No.: PCT/AU2008/001204
§ 371 (c)(1),
(2), (4) Date: Feb. 17, 2010

(87) PCT Pub. No.: WO2009/023909
PCT Pub. Date: Feb. 26, 2009

(65) Prior Publication Data
US 2011/0061183 A1 Mar. 17, 2011

(30) Foreign Application Priority Data
Aug. 17, 2007 (AU) .............................. 2007904425

(51) Int. Cl.
E01D 1/00 (2006.01)

(52) U.S. Cl. ..................................... 14/69.5

(58) Field of Classification Search .......... 14/69.5–71.1
See application file for complete search history.

(56) References Cited

U.S. PATENT DOCUMENTS

| 4,693,418 A | 9/1987 | Peterman |
| 4,984,737 A * | 1/1991 | Muth et al. ............. 238/281 |
| 5,024,164 A * | 6/1991 | Leist ....................... 105/101 |
| 5,082,178 A * | 1/1992 | Muth et al. ............. 238/281 |
| 7,838,772 B2 * | 11/2010 | Lubanski ................ 174/97 |
| 2007/0119002 A1 * | 5/2007 | Baranoff ................ 14/69.5 |

FOREIGN PATENT DOCUMENTS

| JP | 04125209 A | 4/1992 |
| JP | 11147603 A | 6/1999 |
| WO | 2008028232 A1 | 3/2008 |

* cited by examiner

Primary Examiner — Raymond Addie
(74) Attorney, Agent, or Firm — Christopher C. Dremann, P.C.; Christopher C. Dremann

(57) ABSTRACT

The present invention relates to a ramp assembly for a mobile shelving system including at least one longitudinal track body having a central channel and transverse edges, said ramp assembly including a plurality of ramp sections disposed on either side of the track body, whereby each ramp section includes a hooked edge adapted to rotatably engage a transverse edge of the track body, the angle of the ramp section being adjustable by way of rotation of the ramp section to thereby accommodate track bodies of different height.

12 Claims, 10 Drawing Sheets

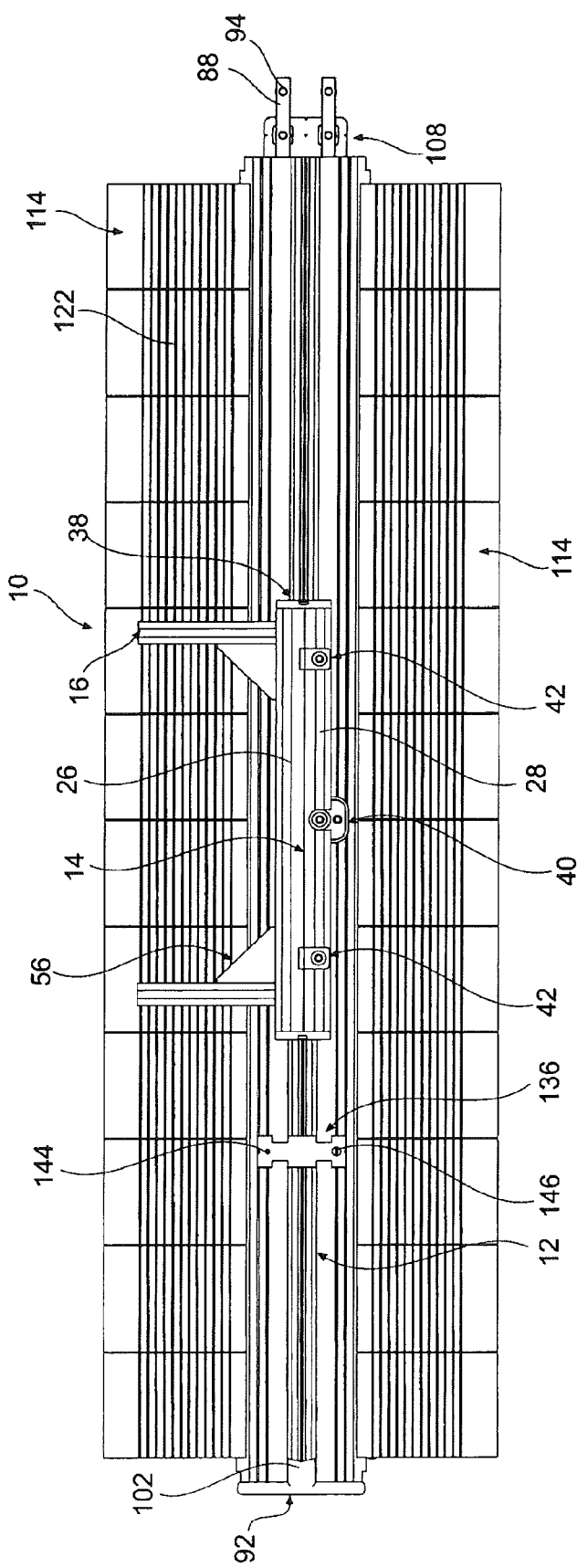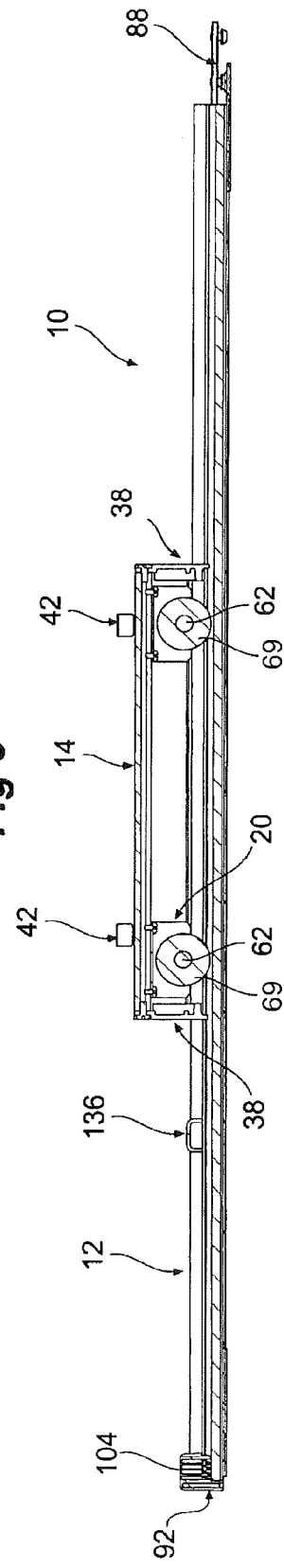

RAMP ASSEMBLY FOR MOBILE SHELVING

CROSS REFERENCE TO RELATED APPLICATION

This application claims the benefit of priority of International Patent Application PCT/AU2008/001204, filed on Aug. 18, 2008, the entire disclosure of which is incorporated herein by reference.

FIELD OF THE INVENTION

The present invention relates to a ramp assembly for mobile shelving and, in particular, to a ramp assembly including ramp sections adapted to be rotatably snap-fit to a mobile shelving track. The ramp pivot geometry is designed to be unobtrusive, and allows removal and refitting of ramps without having to lift or up-end the track.

BACKGROUND OF THE INVENTION

Mobile shelving systems typically include a plurality of shelving units which are equipped with rollers to traverse along spaced apart tracks, each individual shelf unit being a tall and narrow structure having an array of horizontal shelves.

The mobile shelving tracks are required to be aligned and adjusted to compensate for uneven floors. As a result, the track is elevated further above the floor at some points, causing a tripping hazard and, in some circumstances, restricting access to the user area between the mobile shelving units. For example, if a person in a wheelchair wished to access the service area between shelving units, existing tracks provides quite a considerable obstacle.

Traditionally, mobile shelving tracks have been secured to the floor and a false floor placed there above, creating an elevated work area. This is quite an expensive option because the significant extra material required. Apart from not adequately addressing the access issues, there are also inherent problems associated with fixed floor tracks in terms of their appearance, floor damage, and installation time and costs.

Ramp assemblies lining the transverse edges of a track have been proposed, which serve to ameliorate some of these issues. However, even though they reduce the track obstacle, they often produce tripping hazards by way of their connection to the track.

It is therefore an object of the present invention to overcome the aforementioned problems and to provide the public with a useful alternative.

SUMMARY OF THE INVENTION

Therefore in one form of the invention there is proposed a ramp assembly for mobile shelving which is supported above a longitudinal track body, the ramp assembly having at least one ramp section including a substantially upwardly facing female portion extending along one edge thereof, the female portion adapted to rotatably engage a substantially downwardly facing and correspondingly shaped male portion extending longitudinally along an outer edge of the track body, whereby when the male and female portions are engaged, the ramp section extends transversely outwardly from the track body to a ground surface above which the track body is supported, whereby the rotatable engagement enables the angle of the ramp section to be adjusted in accordance with the height of the track body.

The ramp assembly is therefore designed to provide an integrated pivot attachment for ramp sections so that they are easily snap-fit to the track body. The resultant track and ramp assembly is visually appealing and safe for wheel chairs and the like to traverse over. The ramp pivot geometry is designed to allow for quick and easy removal and refitting of the ramp sections, for the purposes of re-levelling the track, without the need to lift up or up-end the track.

Preferably each ramp section includes a substantially flat body having a first end being a ground surface contact edge, and an opposed second end being a track body abutment edge, the second end including the female portion.

In preference the track body male portion is disposed below the track body outer edge, such that when the ramp section is engaged with the track body, the track body abutment edge of the ramp section abuts with the track body outer edge to form a flush upper surface between the ramp section body and the track body edge.

Preferably the ramp section female portion extends downwardly from the track body abutment edge inwardly towards the track body longitudinal axis, and then upwardly to thereby form a hook section for rotatably engaging the male portion.

In preference the male portion is partially defined by a receiving channel on the underside of the track body and inwards from the outer edge, the receiving channel being correspondingly shaped with the ramp curved hook section.

In preference when attaching the ramp section to the track body edge, the track body male portion is adapted to be inserted into the female portion of the ramp section, which is then adapted to be rotated so that the hook section rotatably engages the receiving channel.

Preferably the hook section is adapted to be rotatably snap-fit in the receiving channel.

Preferably the track body receiving portion of the ramp section includes a resilient lining between itself and the track body edge, the resilient lining adapted to provide a biasing force on the ramp section so that the ground surface edge is urged towards the ground surface.

Preferably the resilient lining extends the length of the track body and thereby assists in simultaneous fitting of multiple ramp sections.

In preference the resilient lining is in the form of a rubber tube.

Preferably the ramp section flat body is substantially hollow and includes strengthening ribs.

In preference a plurality of ramp sections are fitted side by side along the length of the track body.

In a further form of the invention there is proposed a ramp assembly for a mobile shelving system including at least one longitudinal track body having a central channel and edges extending along transverse sides thereof, the ramp assembly including a plurality of ramp sections disposed on either side of the track body, whereby each ramp section includes a substantially upwardly facing hooked edge defining a female portion of the ramp body adapted to rotatably engage a substantially correspondingly shaped and downwardly facing male portion associated with an outer edge of the track body, the angle of the ramp section being adjustable by way of rotation of the ramp section to thereby accommodate track bodies of different height.

BRIEF DESCRIPTION OF THE DRAWINGS

The accompanying drawings, which are incorporated in and constitute a part of this specification, illustrate several

FIG. 3 illustrates a top view of the mobile shelving track and runner assembly of FIG. 1.

FIG. 4 illustrates a side view of the mobile shelving track and runner assembly of FIG. 1.

DESCRIPTION OF THE PREFERRED EMBODIMENTS

Figure 1:
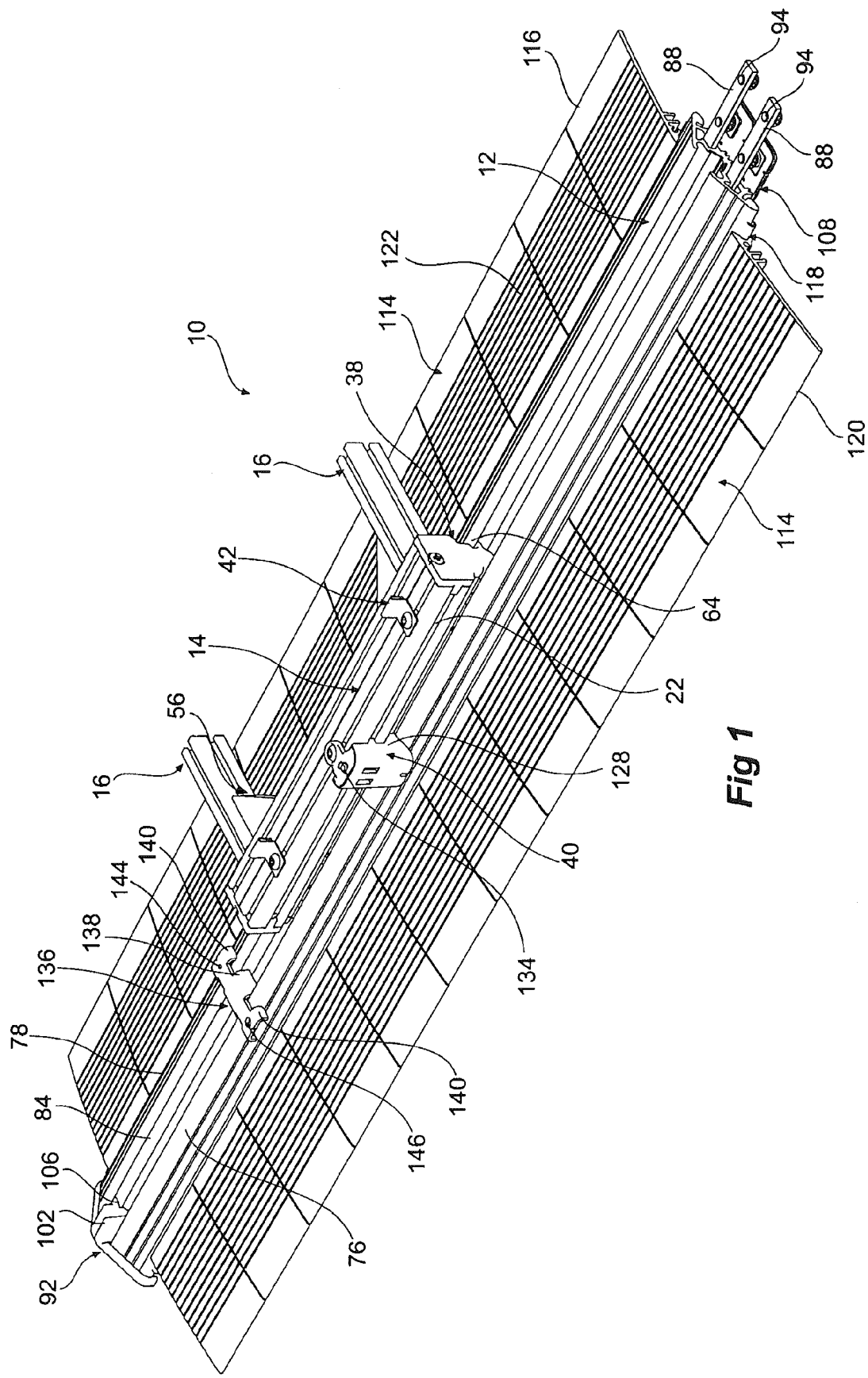
FIG. 1 illustrates a top perspective view of a mobile shelving track and runner assembly.
Figure 2:
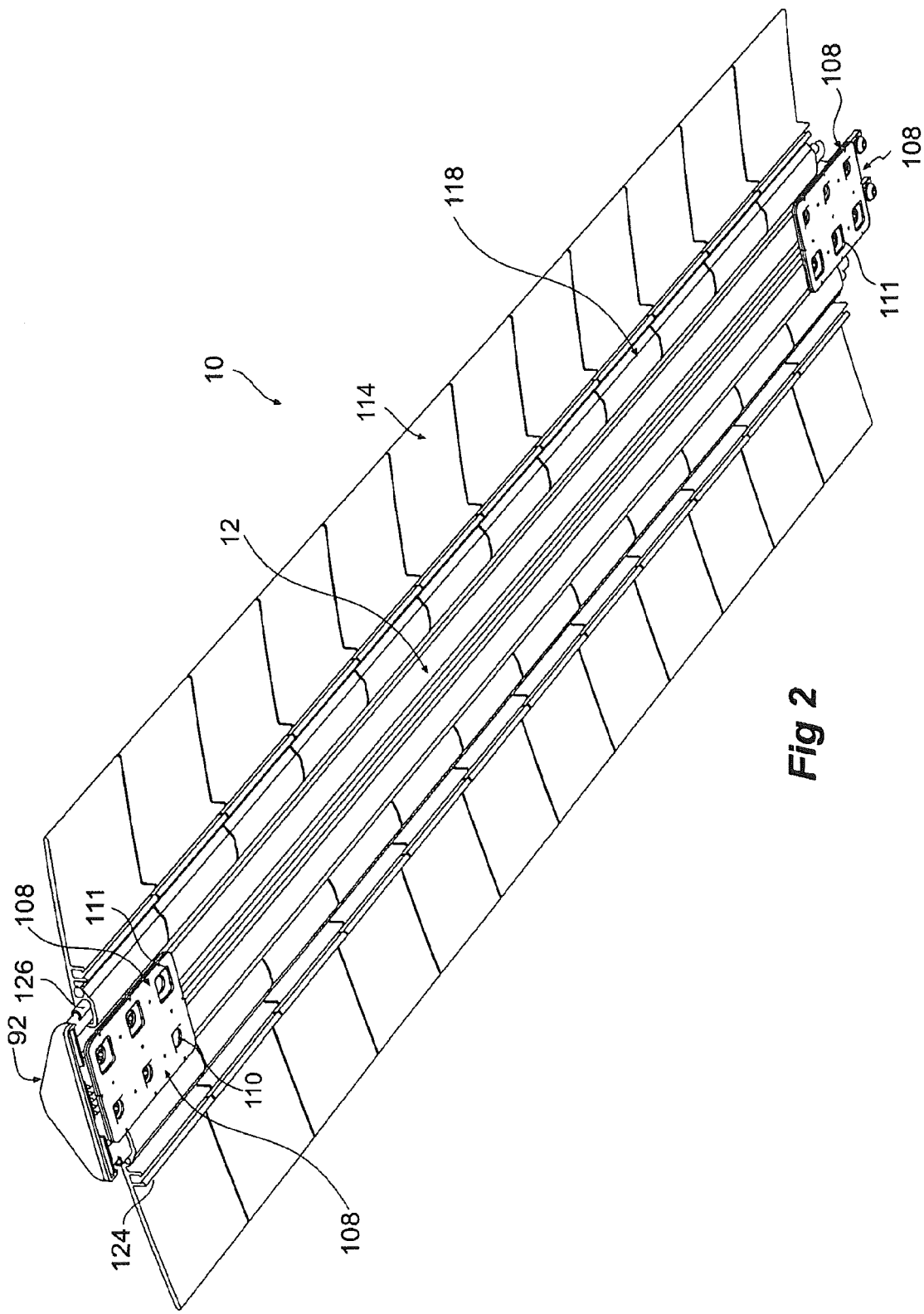
FIG. 2 illustrates an underside perspective view of the mobile shelving track and runner assembly of FIG. 1.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

While the present invention is directed specifically towards a ramp assembly for mobile shelving, other components which form part of a complete mobile shelving system according to a preferred embodiment of the invention are also described.

A track and runner assembly 10 for mobile shelving is shown in FIGS. 1-4. The assembly 10 comprises one or more longitudinal tracks 12, a longitudinal runner 14 configured to slideably engage each track 12 and to support a shelving unit (not shown), otherwise known as a compactus, thereabove, and transverse cross members 16 for connecting two or more runners 14 together. A typical shelving unit is adapted to be mounted above two runners 14 slideable along two tracks 12 which are spaced apart by a distance corresponding approximately with the length of the shelving unit.

Figure 5:
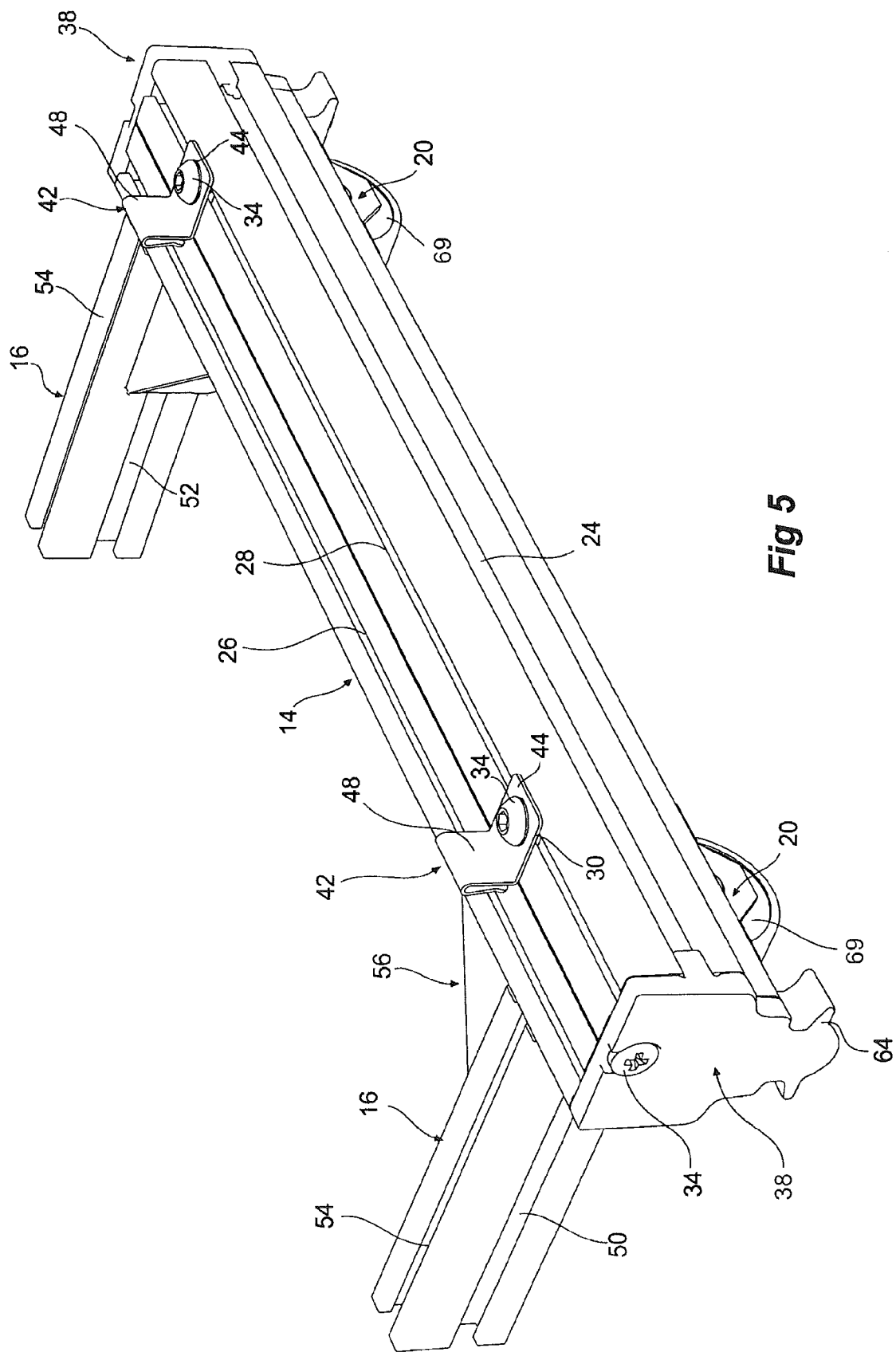
FIG. 5 illustrates a top perspective view of the runner and cross members forming part of the mobile shelving track and runner assembly of FIG. 1.
Figure 6:
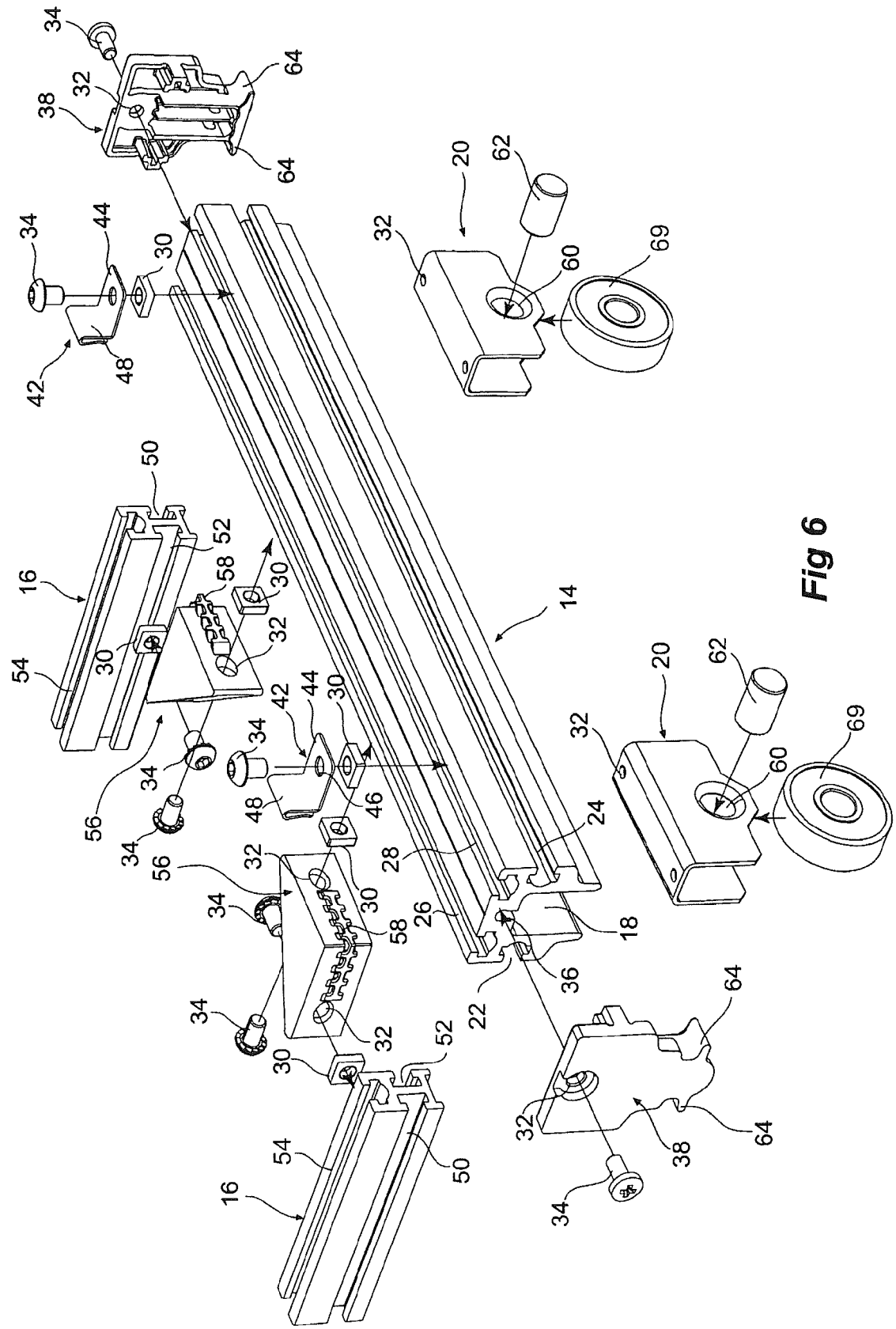
FIG. 6 illustrates an exploded perspective view of the runner and cross members shown in FIG. 5.

The runner 14 is shown most clearly in FIGS. 5-6. The runner 14 is substantially in the form of an inverted U-shaped extrusion, having a primary channel 18 extending there along adapted to accommodate one or more roller cartridges 20, and four slots 22, 24, 26 and 28 extending along right, left and top sides thereof. In particular, slot 22 extends along the left side of the runner 14, slot 24 extends along the right side, and slots 26 and 28 extend along the upper side of the runner 14. The slots 22, 24, 26 and 28 are preferably in the form of T-slots, shaped like so to accommodate square nuts 30 having internal threads. This provides for fast, versatile construction because the nut 30 provides an anchor point for external items at any point along the runner 14.

Once the nut 30 is moved to a desired position, the item, which typically includes a mounting aperture 32, is moved into position so that the aperture 32 and nut 30 become coaxially aligned. A screw 34 is used to extend through the aperture 32, through the slot 22, 24, 26 or 28, and into the nut 30 for threaded engagement therewith. Extending centrally along the top of the primary channel 18 is a further slot 36 providing a further mounting means for the roller cartridges 20 and end brackets 38, as will become apparent.

The runner 14 has been designed so that no additional post-processing of the extrusion is required after it has been cut, i.e. no drilling, slotting, etc.

The following description relates to examples of items which are mountable to the runner 14. Some of these are necessary items, for example, the transverse cross members 16, but others are not necessarily essential, such as a locking bracket 40 for example. It is to be understood that other items which are not shown and described herein, could also be mounted to the runner 14, for example, sensors (not shown), motors (not shown), mechanical drive devices, and the like.

Mounted above the runner 14 are one or more clips 42 configured for engagement with a corresponding receiving means located beneath the shelving unit, such as a correspondingly shaped aperture (not shown), for example. Clip 42 includes a mounting portion 44 having a mounting aperture 46 extending therethrough, and a second portion 48 upstanding from the mounting portion 44 and doubled over for engagement with the corresponding receiving means. The clips 42 are fixed to the runner 14 using a screw 34 adapted to extend through aperture 46 to thereby engage a nut 30 located within slot 28, as described above. In the embodiment shown, there are two spaced apart clips 42 for each runner 14.

Two cross members 16 are adapted to extend between runners 14 on spaced apart tracks 12 to provide the required support for each shelving unit. The cross members 16 are in the form of substantially I-shaped extrusions having slots 50, 52 and 54 on left side, right side and top sides thereof, respectively. In preference the slots 50, 52 and 54 are also substantially in the form of T-slots engageable by screw/nut connections as described above, when mounting external items thereto.

Each cross member 16 is coupled to the runner 14 using hollow, triangular shaped brackets 56 at the junction therebetween. The perpendicular walls of the bracket 56 include outwardly extending projections 58 being shaped to fit snugly within the side slots 52 and 22 of both the cross member 16 and the runner 14 respectively. The projections 58 are ribbed to facilitate insertion through the slots and so that any impact loads on the bracket 56 are reduced.

Also located on the perpendicular walls of the bracket 56 are mounting apertures 32. The mounting apertures 32 on the bracket 56 are positioned to fix the cross member 16 in a perpendicular arrangement relative to the runner 14, that is, each perpendicular wall of the bracket 56 is mounted to the cross member 16 and runner 14 respectively. Again, nuts 30 and screws 34 are preferably used for connecting the respective components.

In order for the runner 14 and hence the shelving unit to be slideable along the track 12, the runner 14 must also include means of housing the roller cartridges 20 mentioned above. The present invention provides that the primary channel 18 of the runner 14 accommodates one or more roller cartridges 20.

Each roller cartridge 20 is also of an inverted U-shaped configuration and of a size to fit inside the runner primary channel 18. The top side of the roller cartridge 20 includes two spaced apart mounting apertures 32, so that when the roller cartridge 20 is positioned in a desired location along the channel 18, it can be secured using self-tapping screws 34 extending through the apertures 32 and into slot 36. Such a configuration means that the roller cartridge 20 may be fitted to the runner 14 without the need for drilling. Typically, each shelving unit will include a roller cartridge 20 at the longitudinal ends of each runner 14, however, there may be circumstances where more are required, and the runner primary channel 18 may accommodate for this.

The roller cartridge 20 includes larger, co-axially aligned apertures 60 extending through its side walls. A pin 62 which extends through the apertures 60 is used to maintain a roller 69 inside the cartridge 20. The roller 69 is rotatable about the pin 62 and allows the runner 14 and hence the shelving unit to move relative to the track 12, as will become apparent.

Also mountable to the runner 14 are end brackets 38 as mentioned. Not only are the end brackets 38 used to cap off the ends of the runner 14, they are configured to prevent the shelving unit from tilting. Each end bracket 38 is in the form of a rigid housing having an internal structure which corresponds substantially in shape with the cross section of the runner extrusion, so that it may engage an end thereof. A self-tapping screw 34 is used to fix the end bracket 38 in place, the screw 34 extending through an uppermost aperture 32 of the end bracket 38, and into the runner slot 36. At the base of the end bracket 38 are two transversely extending shoulders 64 which when engaged with the track 12 (as described below), are designed to prevent the shelving unit from toppling over. The end bracket 38 therefore constitutes the anti-tilt means of the assembly 10.

Figure 7:
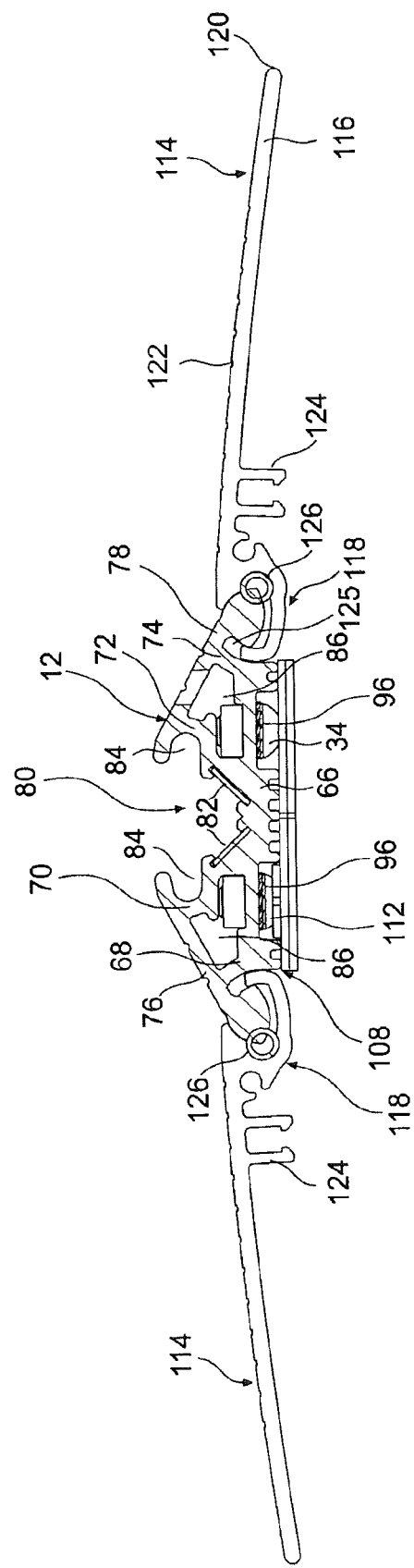
FIG. 7 illustrates a cross-sectional view of the track forming part of the mobile shelving track and runner assembly of FIG. 1.
Figure 8:
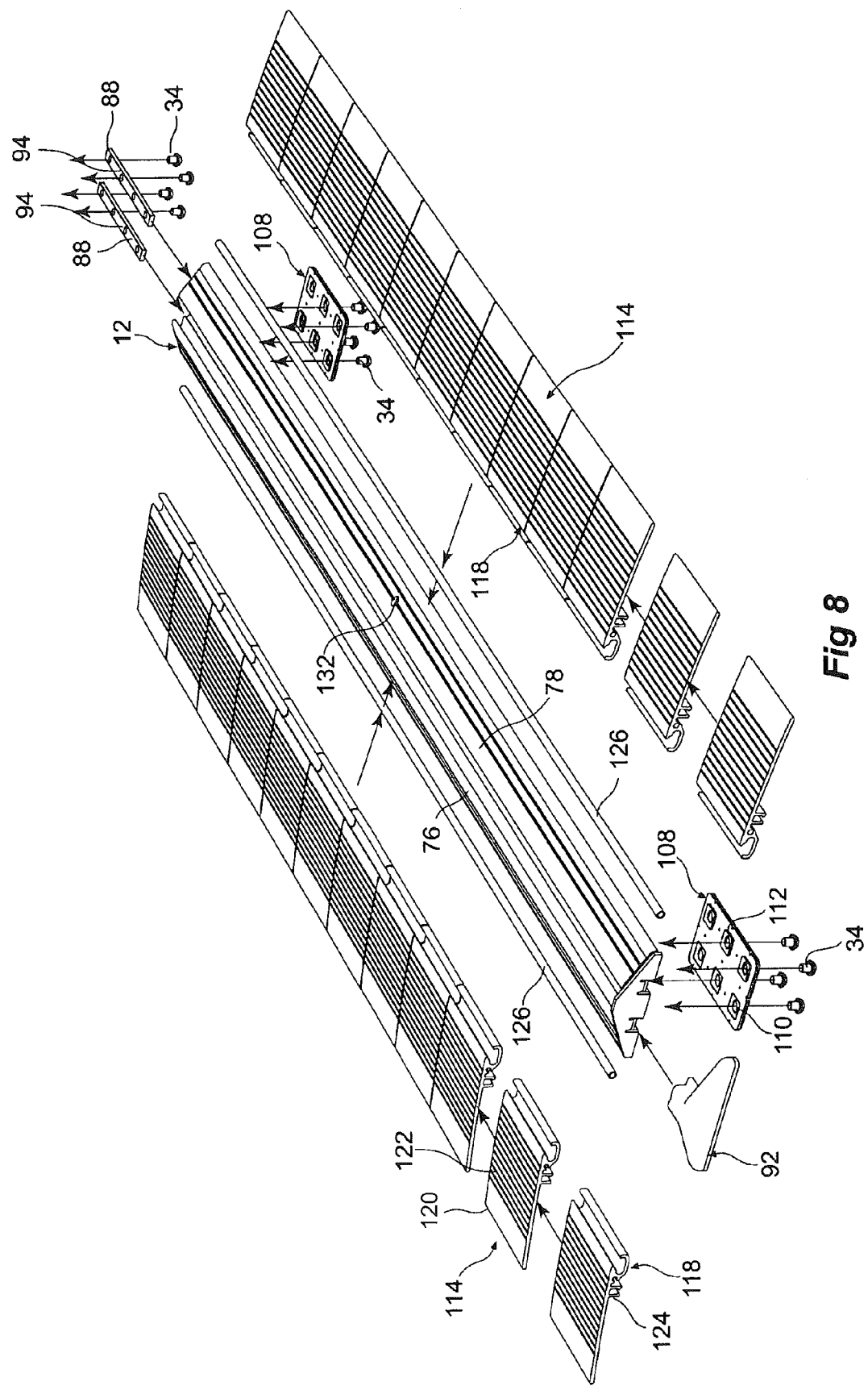
FIG. 8 illustrates an exploded perspective view of the track shown in FIG. 7.

Referring now to FIGS. 7-8 in particular, it can be seen that the track 12 is also made up of an extruded length of metal and includes a hollow profile. The track 12 comprises generally a base 66, internal walls 68, 70, 72 and 74, and external walls 76 and 78 which are each integrally formed. The external walls 76 and 78 at upper ends of the track 12 extend a short distance inwardly, past internal walls 70 and 72. The base 66 and the external walls 76 and 78 form a substantially triangular cross-sectional shape, however, because the external walls fall short of meeting at an apex, they define a central channel 80 extending along the track 12.

The internal geometry of the track 12, in particular the high, hollow profile, allows for robust but unobtrusive track joining, and should remove the need for installers to use glue and fit fasteners with high precision, as will become apparent.

The inside surface of internal walls 70 and 72 are shaped to perform two functions. Firstly, at a lowermost region of the channel 80, the internal walls 70 and 72 define a V-shaped guide 82, which is the surface upon which the rollers 69 are supported. The rollers 69 engage the guide 82 centrally with both edges of the roller 69 contacting the guide. The weight of the shelving unit on the roller 69 retains it in the desired position, and allows sufficient friction for it to rotate smoothly across the guide 82. In order to prevent wear, and to strengthen the guide 82, retaining beads (not shown) retain crinoline strips, generally made of steel, along the V-shaped guide 82.

Secondly, disposed above the V-shaped guide 82 are opposed recesses 84 for accommodating shoulders 64 associated with the end bracket 38. Those skilled in the art will readily appreciate that when the assembled runner 14 is positioned above the track 12, with the shelving unit supported thereabove, any lateral movement of the shelving unit would be restricted by the shoulders 64, because they are prevented from upward movement by the upper ends of the external walls 76 and 78. Accordingly, tilting of the shelving units is prevented. This is particularly important when the shelving units have significant weight on the top shelves making them prone to such movement.

Between internal walls 68 and 70, and between internal walls 72 and 74, hollow regions 86 are defined. The hollow regions 86 are adapted to accommodate joining pins 88 which are used to join two track ends together. The hollow regions 86 also accommodate joining pins 90 (FIG. 9) associated with an end stop bracket 92 of the track 12. Therefore, the end stop bracket 92 is mounted to the end of the track 12 using two joining pins 90 associated therewith, while for joining two segments of track 12 together, individual joining pins 88 are used, as shown in FIG. 1.

In both cases, the joining pins 88 and 90 include a plurality of apertures 94 spaced apart there along, and are adapted to be inserted into the hollow regions 86 of the track 12 until they are in co-axial alignment with apertures 96 (FIG. 7) extending through the base 66 of the track 12. Self-tapping screws 34 are once again used to engage the coaxial apertures 94, 96 and thereby secure the components together.

Figure 9:
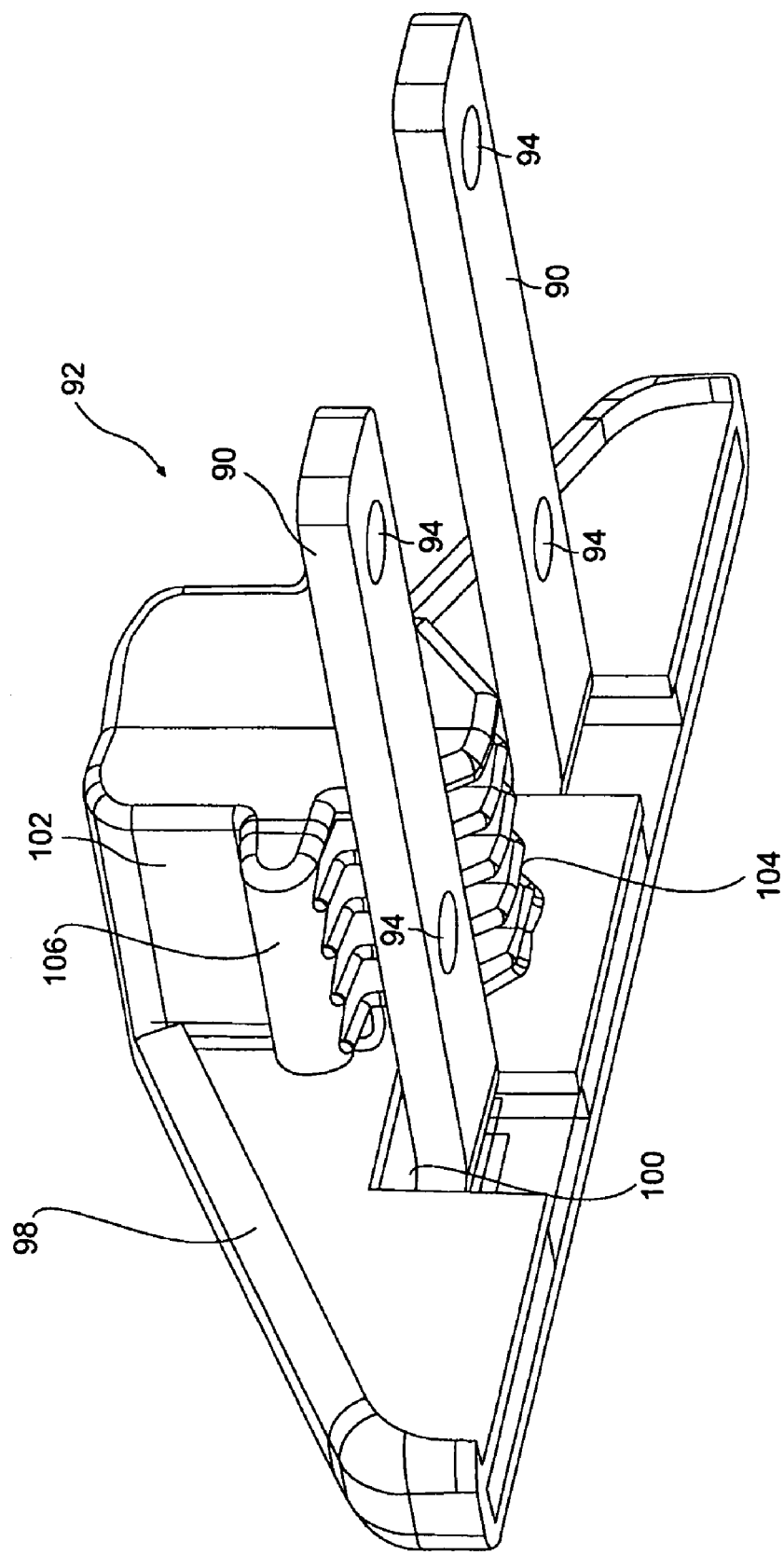
FIG. 9 illustrates a perspective view of a track end stop bracket forming part of the mobile shelving track and runner assembly of FIG. 1.

The end stop bracket 92, as its name suggests, is adapted to be mounted to the end of a track 12. For example, there could be three or four track segments joined to form a single track, wherein the two endmost track segments include end stop brackets 92 for preventing the runner 14 from travelling beyond the tracks. An enlarged view of the end stop bracket 92 is shown in FIG. 9 and it can be seen that it comprises a substantially triangular shaped housing 98, joining pins 90 extending outwardly from an internal bracket plate 100, and a stop portion 102 extending between the joining pins 90 and into channel 80 when the end stop bracket 92 is mounted to the track 12.

The stop portion 102 includes a plurality of ribs 104 which provide an elastomeric buffer for reducing impact loads. Shelving units when moved generate a significant amount of force due to their weight and therefore require that the track end stops be robust enough to dampen such force upon impact. The end stop bracket 92 also includes anti-tilt shoulders 106 as per the runner end brackets 38.

The height of the track 12 also needs to be maintained level along its length. It is also preferable for the height of the track 12 to be easily adjustable even after assembly. One or more packers 108 shown most clearly in FIG. 2 and the cross sectional views, are used to achieve this. Each packer 108 is substantially rectangular in shape and includes a 3×2 matrix of apertures 110 extending therethrough. One row of three apertures 110 of the packer 108 includes elevated square surrounding portions 112. The adjacent row of three apertures 110 include locating means 111 for engaging the elevated square surrounding portions 112 of a second packer 108 positioned there beneath. Each adjacently stacked packer 108 is rotated by 180 degrees relative to the other.

One or more packers 108 (depending on the desired height) are adapted to sit beneath the joining pins 90 at the ends of the track 12, as well as beneath the joining pins 88 at one or more joints between track segments. The apertures 110 are designed to accommodate the head portions of the self-tapping screws 34 which engage the joining pins 88 and 90. Those skilled in the art will readily appreciate that any number of stacked packers 108 could be added or removed to increase or decrease the height of a particular section of track 12.

A further advantage to the improved stiffness characteristics of the track extrusion is that it allows for wider spacing of the packers 108 along the track 12.

Figure 10:
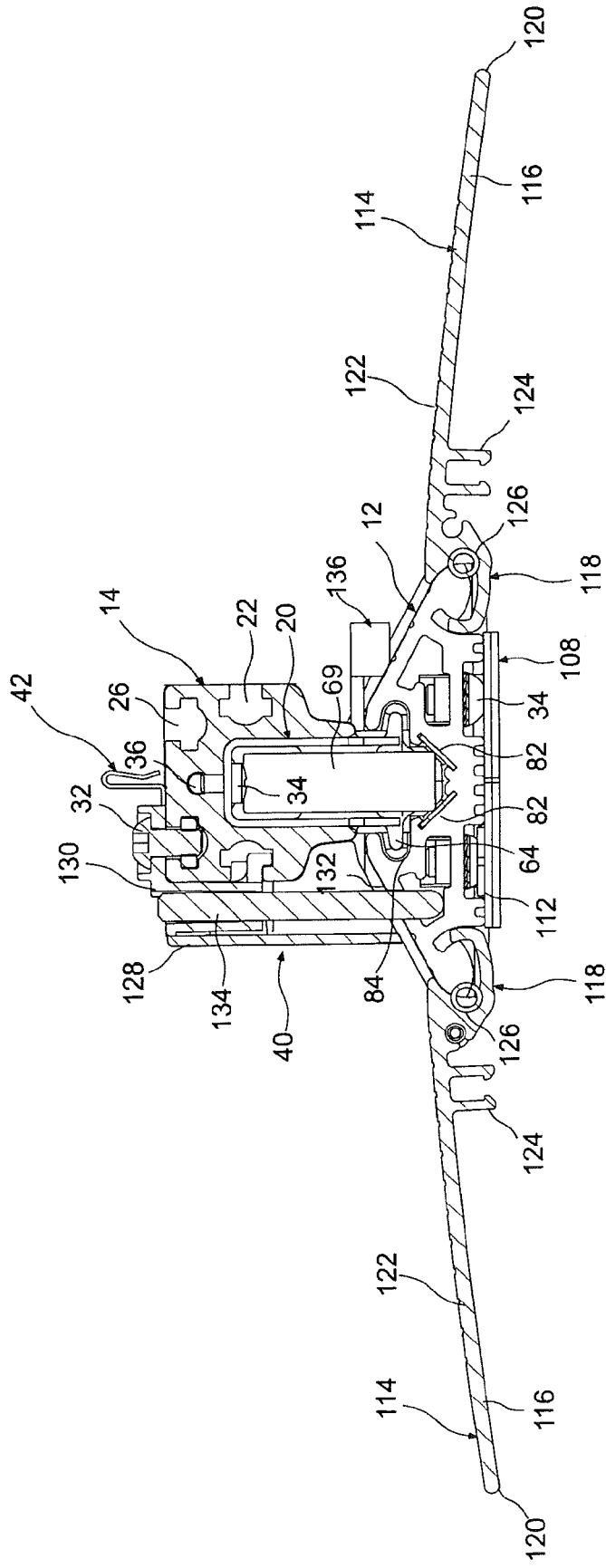
FIG. 10 illustrates a cross sectional view of the mobile shelving track and runner assembly of FIG. 1, without the cross members attached.
Figure 11:
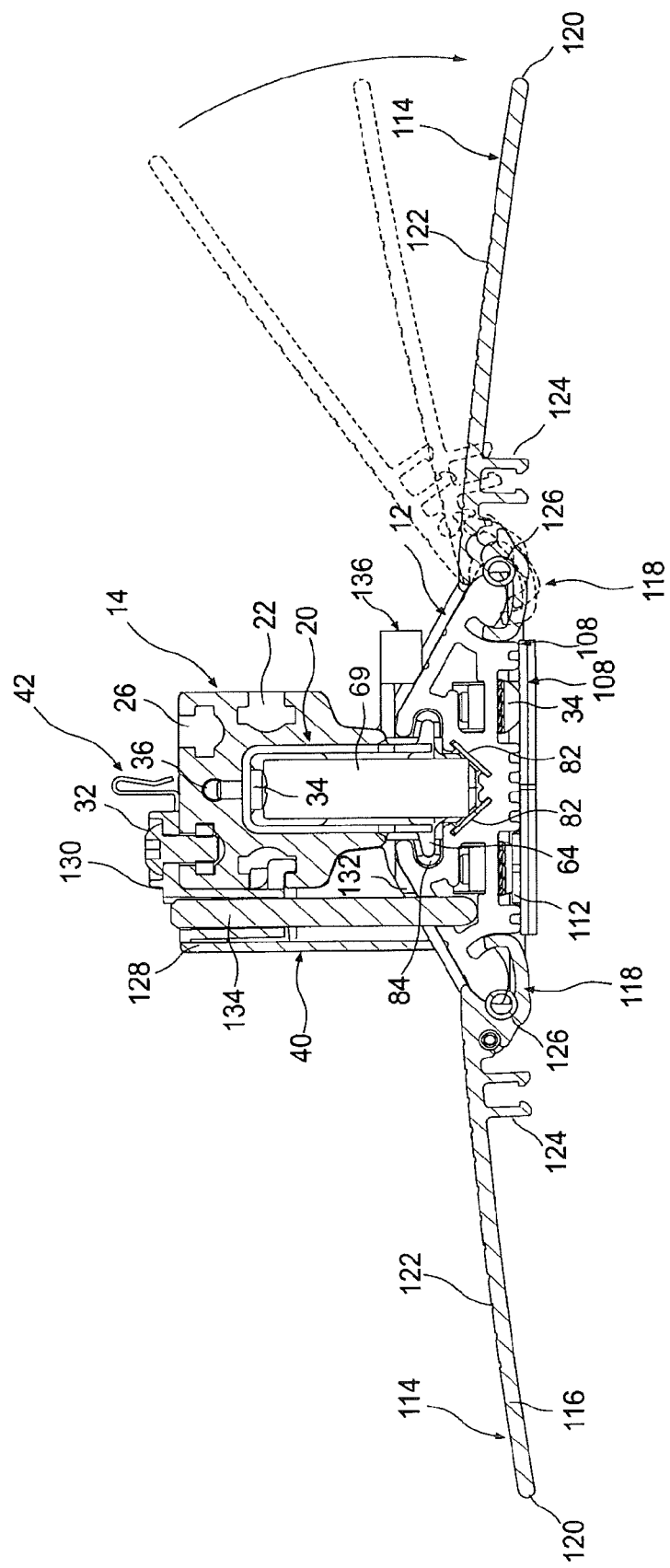
FIG. 11 illustrates the cross sectional view of FIG. 10 showing the way in which the ramp section is mounted to the track, in accordance with the present invention.

Turning now to the main feature of the present invention, as shown in FIGS. 10-11, the assembly 10 includes a plurality of attachable ramp sections 114. These are used to provide a smooth surface over the track 12 and prevent the track 12 from forming a tripping hazard. Each ramp section 114 includes a substantially rectangular body 116 having a hook section 118 at one end thereof, and a straight edge 120 at the opposed end adapted to lie substantially flush with the ground when assembled. The ramp section body 116 includes a plurality of ribs 122 on its upper surface for gripping purposes. There are reinforcing members 124 positioned below the body 116 which are advantageous because they reduce the overall weight of the ramp section 114 and maintain strength. The hook section 118 extends downwardly from the body 116, then inwardly and upwardly with respect to the track 12.

Between the lower end of the external walls 76 and 78, and the internal walls 68 and 74 respectively, there are defined receiving channels 125 for engaging the hook section 118 of each ramp section 114. In particular, each ramp section 114 is configured to engage the receiving channels 125 by way of a rotatable snap-fit. FIG. 12 illustrates this process, whereby the hook section 118 is inserted into the receiving channel 125 and then urged upwardly while rotating edge 120 of the body downwardly until the hook section 118 is snap-fit in place. This ramp pivot geometry is designed to allow removal and refitting of ramps (for re-levelling purposes) without having to lift up or up-end the track 12.

Because the receiving channel 125 is located on the underside of the track assembly, engagement with the hook section 118 occurs without any obstruction or disturbance to the surface above, resulting in a flush upper surface that is free from gaps that may result in items catching on the track, and from tripping hazards.

A rubber tube 126 is also inserted between the rounded end of the external walls 76 and 78 and the junction between the downwardly and inwardly extending surfaces of the hook section 118. The tube 126 provides a down-force and minimizes ramp "kick-up" which could create a tripping hazard. A further advantage to the rubber tube 126 is that it also acts as a flexible joiner, assisting in handling and simultaneous fitting of multiple ramp sections to the track 12.

The use of such ramps allows for easy access to the service area between shelving units in that the tripping hazard is reduced. It also provides for a relatively flat surface for wheelchairs and the like to easily traverse over.

Finally, the runner 14 is able to be locked at different positions along the track 12. A locking bracket 40 is shown in the drawings which is also engageable to an upper slot 28 of the runner 14, as well as the side slots, by means described above. The locking bracket 40 includes a housing 128 mounted to the runner 14, the housing 128 defining a vertical chamber extending downwardly alongside the runner 14 to the track 12. The chamber includes a vertical aperture 130. When the shelving unit is to be locked, the runner 14 is moved along the track 12 until the vertical aperture 130 becomes co-axially aligned with an aperture 132 that has been pre-drilled into the track 12. Once aligned, a locking pin 134 can be inserted through the co-axially aligned apertures 130 and 132, into the hollow region 86 where it rests on the base 66, thereby locking the runner 14 to the track 12.

A jig 136 is provided for forming the pre-drilled apertures 132 in the track 12. The jig 136 is an elongate structure mountable to the track 12 in a transverse arrangement as shown in FIG. 1. The jig 136 includes a downwardly extending section 138 at its center which extends inside channel 80, as well as downwardly extending sections 140 at ends thereof which abut with the external walls 76 and 78 of the track 12. On opposed ends of the jig 136 are apertures 144 and 146.

The jig 136 is first adapted to be mounted to the track 12 so that aperture 144 is positioned over a desired point to be drilled. The purpose of this smaller aperture 144 is to mark the track 12 with a suitable tool (not shown), the mark acting as a locating guide for a drill bit or the like used to drill a hole through the track 12. The jig 136 is then demounted from the track 12, rotated by 180 degrees, and mounted to the track 12 again so that the larger aperture 146 extends over the marked point. A drill (not shown) can then be used to drill a hole through the track 12 where marked.

It is to be understood that the design of some of the components shown and described could change where necessary. For example, where there is a mechanical driving means associated with the runner 14, one of the track external walls 78 would extend a greater distance outwards from the channel 80 and include a flat upper surface (not shown) for accommodating a drive wheel (not shown). Such a track would therefore include a further hollow region 86. In such circumstances, the same packers 108 could be used but simply rotated by 90 degrees so that instead of extending longitudinally relative to the track 12, they would extend transversely.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow, except where the context requires otherwise due to express language or necessary implication, the word "comprising" is used in the sense of "including", i.e. the features specified may be associated with further features in various embodiments of the invention.

That which is claimed is:

1. A ramp assembly for mobile shelving which is supported above a longitudinal track body, comprising:
    at least one ramp section including a substantially upwardly facing female portion extending along one edge thereof, said female portion adapted to rotatably engage a substantially downwardly facing and correspondingly shaped male portion extending longitudinally along an outer edge of said track body, whereby when said male and female portions are engaged, said ramp section extends transversely outwardly from said track body to a ground surface above which said track body is supported, whereby said rotatable engagement enables the angle of said ramp section to be adjusted in accordance with the height of said track body.

2. A ramp assembly for mobile shelving as in claim 1 wherein each ramp section includes a substantially flat body having a first end being a ground surface contact edge, and an opposed second end being a track body abutment edge, said second end including said female portion.

3. A ramp assembly for mobile shelving as in claim 2 wherein said male portion of said track body is disposed below said track body outer edge, such that when said ramp section is engaged with said track body, the track body abutment edge of the ramp section abuts with the track body outer edge to form a flush upper surface between said ramp section and said track body outer edge.

4. A ramp assembly for mobile shelving as in claim 1 wherein said female portion of said ramp section extends downwardly from a track body abutment edge, inwardly towards a longitudinal axis of the track body, and then upwardly to thereby form a hook section for rotatably engaging said male portion of said track body.

5. A ramp assembly for mobile shelving as in claim 4 wherein said male portion of said track body is partially defined by a receiving channel on the underside of said track body and inwards from the outer edge, said receiving channel being correspondingly shaped with said hook section.

6. A ramp assembly for mobile shelving as in claim 5 wherein when attaching said ramp section to the track body outer edge, said male portion of said track body is adapted to be inserted into the female portion of the ramp section, which is then adapted to be rotated so that said hook section rotatably engages the receiving channel.

7. A ramp assembly for mobile shelving as in claim 6 wherein said hook section is adapted to be rotatably snap-fit in said receiving channel.

8. A ramp assembly for mobile shelving as in claim 5 wherein said female portion of the ramp section includes a resilient lining between itself and said track body outer edge, said resilient lining adapted to provide a biasing force on said ramp section so that a ground surface contact edge is urged towards a ground surface.

9. A ramp assembly for mobile shelving as in claim 8 wherein said resilient lining extends the length of the track body and thereby assists in simultaneous fitting of multiple ramp sections.

10. A ramp assembly for mobile shelving as in claim 8 wherein said resilient lining is in the form of a rubber tube.

11. A ramp assembly for mobile shelving as in claim 1 wherein a plurality of ramp sections are fitted side by side along the length of the track body.

12. A ramp assembly for a mobile shelving system including at least one longitudinal track body having a central channel and edges extending along transverse sides thereof, the ramp assembly comprising:

a plurality of ramp sections disposed on either side of said track body, whereby each ramp section includes a substantially upwardly facing hooked edge defining a female portion of said ramp section adapted to rotatably engage a substantially correspondingly shaped and downwardly facing male portion associated with an outer edge of said track body, the angle of said ramp section being adjustable by way of rotation of the ramp section to thereby accommodate track bodies of different height.

* * * * *